Oct. 1, 1957 E. W. VAN WINKLE 2,808,537

FOCUS COMPENSATION CIRCUIT

Filed March 8, 1954 2 Sheets-Sheet 1

INVENTOR.
EDGAR W. VAN WINKLE
BY George Lipkin
Lee R. Huntzberger
ATTORNEYS

Oct. 1, 1957 E. W. VAN WINKLE 2,808,537

FOCUS COMPENSATION CIRCUIT

Filed March 8, 1954 2 Sheets-Sheet 2

INVENTOR.
EDGAR W. VAN WINKLE
BY George Sipkin
Lee P. Huntzberger
ATTORNEYS

United States Patent Office 2,808,537

Patented Oct. 1, 1957

2,808,537

FOCUS COMPENSATION CIRCUIT

Edgar W. Van Winkle, Rutherford, N. J., assignor to the United States of America as represented by the Secretary of the Navy Application March 8, 1954, Serial No. 414,915

5 Claims. (Cl. 315—22)

This invention relates to a focus compensation circuit for flat face cathode ray tubes and more particularly to a focus compensation circuit for flat face cathode ray tubes for improving definition during terminal portions of each sweep by means of automatic control of the focus current.

In a flat face cathode ray tube the radius from the center of the deflection coil to the tube face is longer at the edges or terminal portions of the sweep than it is at the center of the sweep. Where this variation in radius is not taken into account by the power supply circuit for the focus coil, the definition at the edges of the sweep is substantially poorer than the definition about the center of the sweep. This conclusion is based upon the assumption that the spot is in focus at the center of screen. To improve the definition in a flat face cathode ray tube, the current through the focus coil must be varied so that at the terminal portions of the sweep there is a lesser amount of current flowing through the focus coil than the amount of current flowing through the focus coil at the center of the sweep.

An object of this invention is to provide a focus compensation circuit for cathode ray tubes.

A further object is to provide a focus compensation circuit for flat face cathode ray tubes.

A further object is to provide a focus compensation circuit for flat face cathode ray tubes that is combined with the focus coil power supply and that operates to decrease the focus current toward and at each end of a sweep cycle.

A further object is to provide a focus compensation circuit for flat face cathode ray tubes to improve definition.

Figure 1:
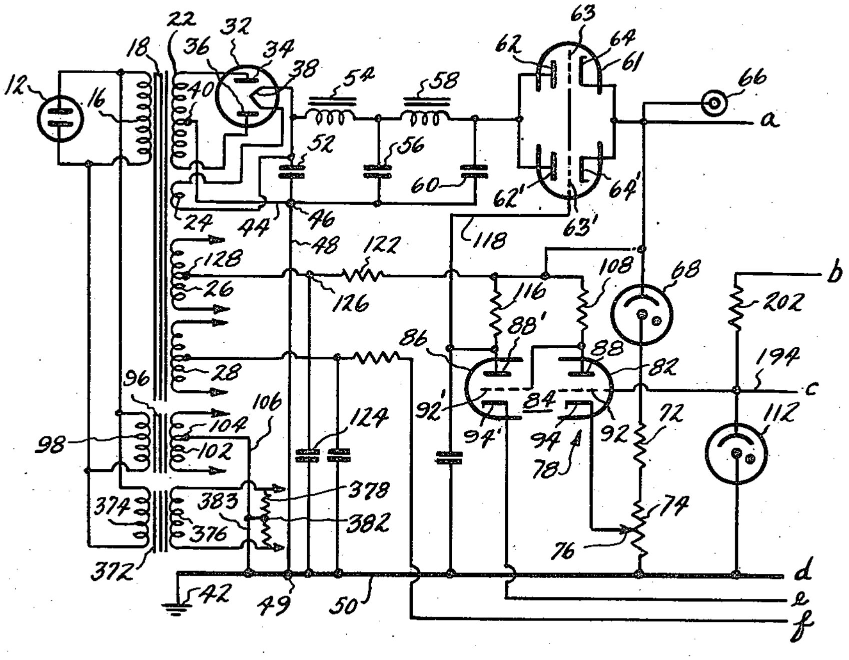
Figure 2:
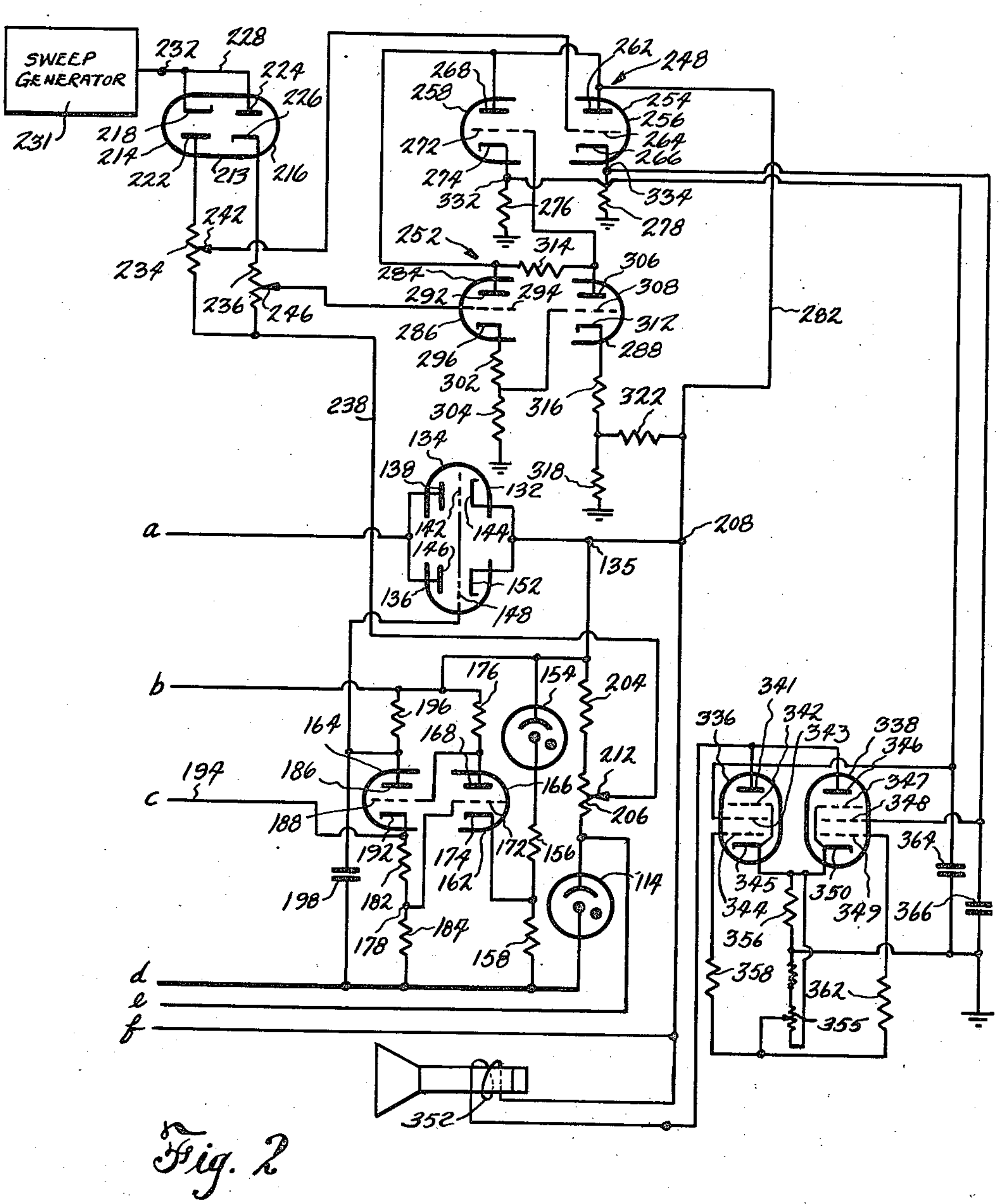

Other objects and many of the attendant advantages of this invention will be readily appreciated as the same becomes better understood by reference to the following detailed description when considered in connection with the accompanying drawings wherein:

Figs. 1 and 2 are the two parts of a single divided wiring diagram of a preferred embodiment of this invention and shows a focus coil power supply including a focus compensation circuit. The ends of the leads terminating at the right side of Fig. 1 and legended *a, b, c, d, e, f* are connected to the ends of the respective leads terminating at the left side of Fig. 2 and legended *a, b, c, d, e, f*.

The circuit shown on the drawing includes a plug 12 adapted to be connected to a house current supply, not shown. The primary winding 16 of a transformer 18 is connected directly across the terminals of plug 12. The transformer 18 further includes a plurality of secondary windings 22, 24, 26, and 28. The secondary winding 22 is connected in circuit with a substantially conventional rectifier-filter-regulartor circuit to provide a plate supply. The rectifier portion of the aforementioned circuit comprises a full-wave rectifier 32 (e. g. 5R4) having plates 34 and 36 and a filament cathode 38. The secondary winding 22 is centertapped at 40. The centertap 40 is connected to a suitable source of reference potential hereinafter referred to as ground and conventionally shown at 42. Secondary winding 24 of transformer 18 is connected to the filament cathode 38 for supplying the necessary heating power thereto.

The power output of the full-wave rectifier 32 is filtered by means of a capacitor-input filter. The filter includes an input capacitor 52, a choke 54, a capacitor 56, a choke 58, and a capacitor 60.

The voltage regulator portion of the circuit includes a double triode 61 (e. g. 6AS7) connected to the output terminal of the filter circuit. The double triode 61 includes a first triode section having a plate 62, a control grid 63 and a cathode 64. The other section includes a plate 62′, a control grid 63′ and a cathode 64′. Corresponding elements of both sections of the double triode 61 are electrically joined. A jack receptacle 66 is connected to the cathodes of the double triode 61 to provide a convenient test point and a voltage source. The filament, not shown, of the double triode 61 is adapted to be connected across the secondary winding 26. Connected between the cathodes of the double triode 61 and ground lead 50 is a voltage regulator tube 68 in series with a resistor 72 and a resistance winding of a potentiometer 74.

A triode amplifier stage 78 is connected across the series combination of voltage regulator tube 68, resistor 72, and the adjacent portion of the resistance winding of potentiometer 74. The triode amplifier stage 78 includes one section 82 of a double triode 84 (e. g. 12AU7) having another section 86. The section 82 and section 86 of the double triode 84 include plates 88 and 88′, control grids 92 and 92′, and cathodes 94 and 94′, respectively.

The heater power for the filament, not shown, of the double triode 84 is provided by a separate filament transformer 96. Transformer 96 includes a primary winding 98 and a secondary winding 102, centertapped to ground 42. The primary winding 98 is connected directly across the terminals of the plug 12.

A plate load resistor 108 in circuit with triode section 82 is connected to the terminal 66 of the voltage regulator. The cathode 94 of the triode section 82 is connected to tap 76 of the potentiometer 74. The bias on the grid 92 is held constant by means of a voltage regulator tube 112 (e. g. OA3) whose plate is connected to the grid 92 and whose cathode is connected to the ground 42. The voltage between the cathode 94 of triode section 82 and the ground 42 does not remain constant. It depends upon the amount of current flowing through the portion of the resistance coil of the potentiometer 74 that is between the potentiometer tap 76 and ground 42. The voltage at the plate of the voltage regulator tube 68 equals that at terminal 66. The section 86 of the double triode 84 serves as the second stage of a two-stage triode amplifier. The cathode 94′ of the triode section 86 is held at a constant potential with respect to the ground 42 by connection across the voltage regulator tube 114 (e. g. OA2). A plate-load resistor 116, identical to plate-load resistor 108, is connected in the plate circuit of triode section 86 and to voltage regulator terminal 66. The plate 88′ of the triode section 86 is connected to the grids of the double triodes 64 by means of the connecting lead 118.

An integrator circuit including a resistor 122 and a condenser 124 is connected between the voltage regulator terminal 66 and ground 42. The time constant of this RC circuit is long being comparable to the period of the input-power frequency. The junction 126 between the resistor 12 and the condenser 124 is connected to the center tap 128 of the secondary winding 26 of the transformer 18. The heater filament, not shown, of the double triode 64, is connected across secondary winding 26.

A second regulator circuit generally similar to the one described above is connected to the output terminal 66 of the first regulator circuit. The second regulator circuit includes a double triode 132 (e. g. 6AS7) generally identical to the double triode 64. The double triode 132 includes a triode section 134 and a triode section 136. The triode section 134 comprises a plate 138, a control grid 142 and a cathode 144. The triode section 136 includes a plate 146, a control grid 148 and a cathode 152. Corresponding elements of the triode sections 132 and 134 are electrically connected. Triode sections 136 and 134 are connected in parallel to handle the circuit power. The cathodes 144 and 152 are connected to the anode of voltage regulator tube 154 (e. g. OA2) which is in series with resistors 156 and 158. A double triode 162 (e. g. 12AU7) comprising a pair of triode sections 164 and 166 is connected as a two-stage amplifier. The triode section 166 has a plate 168, a control grid 172, and a cathode 174. A plate load resistor 176 is connected in circuit with triode section 166 and output terminal 135 of the second regulator. The grid 172 is held at a constant potential with respect to ground 42 by connection to the junction 178 between the resistors 182 and 184. The latter are connected across the voltage regulator tube 112. The potential of the cathode 174 is adapted to vary with respect to ground in accordance with the current passing through the voltage regulator tube 154. As the current increases the potential of the cathode 174 increases with respect to ground and conversely. Since the grid 172 is held at a constant potential with respect to ground, the grid 172 effectively goes more negative with respect to the cathode 174 when more current is flowing through the voltage regulator tube 154. A plate load resistor 176 is connected in circuit with triode section 166 and the terminal 135 of the voltage regulator. The second stage of the double triode 162 includes a plate 186, a control grid 188, and a cathode 192. The output of the first stage 166 at the plate 168 of the triode section 166 is coupled to the grid 188 of the triode section 164. The cathode 192 of the triode section 164 is held constant with respect to ground 42 by means of a direct connection to the anode of the voltage regulator tube 112. A plate load resistor 196, identical to the plate load resistor 176, is connected in circuit with triode section 164 and voltage regulator output terminal 135. A bypass condenser 198 is connected between the plate 186 and the ground 42. The output voltage at plate 186 is coupled back into the grids 142 and 148 of the double triode 132.

The voltage regulator tube 112 is connected in series with a limiting resistor 202, both being disposed between the output terminal 135 and ground 42. Voltage regulator tube 114 is connected in series with a resistor 204 and the resistance winding of potentiometer 206, all three being connected between the output terminal 135 and ground 42. The voltage regulator stages operate in conventional manner to provide constant voltage outputs at terminals 66 and 135.

The focus compensation circuit includes a double diode 213 (e. g. 6AL5) which includes a diode section 214 and diode section 216. The diode section 214 comprises a cathode 218 and a plate 222. The diode section 216 comprises a plate 224 and a cathode 226. Cathode 218 and the plate 224 of the diode section 214 and 216, respectively, are directly connected to another by means of a lead 228 which in turn is directly connected to the input terminal 232. The output voltage of a sweep generator 231 that supplies the sweep energy for the associated cathode ray tube is coupled into terminal 232. The plate 222 and the cathode 226 of the diode section 214 and 216, respectively, are connected in series with identical potentiometers 234 and 236. The opposite ends of the potentiometers 234 and 236 are connected to one another and to the tap 212 of the potentiometer 206 by means of a lead 238. At any setting of the potentiometer tap 212, the potential of tap 212 remains constant. Only one of the diodes sections 214 and 216 conducts at any instant. For example, assume the sweep voltage at the terminal 232 is less than that at tap 212 and going positive. Under that condition only the diode section 214 conducts and continues to do so until the voltage at terminal 232 exceeds that at tap 214, at which time diode scetion 212 ceases to conduct while diode section 216 begins to conduct and continues to do so for so long as the voltage at terminal 232 exceeds that at tap 212. The voltage at the potentiometer tap 212 is approximately equal to the voltage of the sweep when the cathode ray tube spot is at its mid point. The voltage developed at the tap 242 of potentiometer 234 is coupled into the cathode follower stage 248. Correspondingly, the voltage developed at the tap 246 of potentiometer 236 is coupled into a cathode follower stage 252.

The cathode follower stage 248 includes a section 254 of a double triode 256 (e. g. 12AU7). The double triode 256 includes triode section 258. Triode section 256 includes a plate 262, a control grid 264, and a cathode 266. The triode section 258 includes a plate 268, a control grid 272, and a cathode 274. A cathode resistor 276 is connected between cathode 274 and ground 42. Cathode resistor 278 is connected between cathode 266 and ground 42. Both plates 262 and 268 of the double triode 256 are connected together and by means of a lead to output terminal 135 of the voltage regulator.

The cathode follower stage 252 includes the triode section 284 of a double triode 286 (e. g. 12AX7) further including a triode section 288. Triode section 284 includes plate 292, control grid 294, and cathode 296. A pair of series resistors 302 and 304 are connected between the cathode 296 and ground 42. The plate 284 is connected to the output terminal 135 of the voltage regulator by the lead 282. The triode section 288 includes a plate 306, a control grid 308 and cathode 312. Plate load resistor 314 is connected in series with plate 306, and to the output terminal 135 of the voltage regulator by means of the lead 282. Between cathode 312 and ground are a pair of resistors 316 and 318. A resistor 322 is connected between the junction of the resistors 316 and 318 and the output terminal 135 of the voltage regulator. The resistors 316 and 322 are of the same general order of magnitude while both resistors 316 and 322 are about 20 times as large as resistor 318. By the above arrangement, a constant biasing voltage is developed across the resistor 318. The compensation voltages are derived from the terminals 332 and 334 of the cathode resistors 276 and 278. The voltages derived at the two terminals 332 and 334 are coupled to a pair of beam-power amplifier tubes 336 and 338 (e. g. 6Y6). The tube 336 has a plate 341, a shield 342, a screen grid 343, a control grid 344 and a cathode 345. The tube 338 has a plate 346, a shield 347, a screen grid 348, a control grid 349 and a cathode 350. The plates 341 and 346 are connected and the cathodes 345 and 350 are connected. The plates are connected in series with the focus coil 352. The opposite terminal of the focus coil is connected to the focus coil power supply, regulator output terminal 135. The cathodes 345 and 350 of the beam power amplifiers are connected to ground through resistor 356. Connected in series with the control grid 344 is a small value resistor 358. Connected in series with the control grid 349 is a small value resistor 362. A bypass condenser 364 is connected between the screen grid 343 of the beam power amplifier 336 and ground; a bypass condenser 366 is connected between the screen grid 348 of the pentode 338 and ground. Since the focus coil 352 is connected in the plate circuits of the beam power amplifiers 336 and 338, the current flow through the focus coil remains constant so long as there is no change in the potentials of screen grids 343 and 348. Even changing of the focus coil resistance through heating or otherwise will not change the current through the focus coil. The current through the focus coil will change by the action of the focus compensation circuit changing the potentials on the screen grids 343 and 348 of the beam-power amplifiers 336 and 338, alternatively. The voltages on the screen grids 343 and 348 as determined by the focus compensation circuit go negative alternatively to reduce the current to one of the tubes 336 during one-half of the sweep voltage and during the other half of the sweep voltage, the same occurs in the tube 338.

A filament transformer 372 is provided for the tubes 336 and 338. The transformer 372 has a primary winding 374 and a secondary winding 376, the latter being bridged by load-carrying resistors 378 for defining a centertap 382. The centertap 382 of the load-carrying resistors 378 is grounded. The terminals of the secondary winding 376 are connected to the heater filaments, not shown, of the two tubes 336 and 338.

In operation, the focus compensation circuit for a flat face cathode ray tube is combined with the focus power supply. The focus compensation circuit acts to decrease the focus current at each end of each trace resulting in a substantially improved definition at each end of the trace. The focus power supply disclosed herein includes a full-wave rectifier 32 and two similar voltage-regulator sections having output terminals 66 and 135, respectively. The focus current is ultimately controlled by a pair of parallel-connected beam power amplifiers 336 and 338. The focus coil shown at 352 is connected between the plates of the beam power amplifiers 336 and 338 and the source of plate supply for the pentodes. The focus current is selectively adjustable by a potentiometer 355. The potentiometer 355 controls the bias on the two parallel beam power amplifiers 336 and 338. This arrangement permits the use of a low wattage potentiometer for focus control. The focus compensating circuit controls the screen potentials of the two beam power amplifiers 336 and 338. A portion of the sweep voltage energy is applied to the double diode 213 from the sweep generator shown in block form at 231. Bias for the double diode 213 is obtained from the tap of potentiometer 206 which latter is in circuit with the voltage-regulator terminal 135. One-half of the sweep voltage (when the output voltage of the sweep generator 231 exceeds the voltage at tap 212) causes conduction through one diode section 216 and a resultant signal developed across potentiometer 236 is attenuated and applied to the cathode follower 286. The signal is attenuated in the cathode circuit of the cathode follower 286 and then amplified and phase inverted by the tube section 288. The energy level of the signal is then raised by a cathode follower stage 258 before it is applied to the screen grid of the beam-power amplifier 336. The diode section 216 of the double diode 213 ceases conduction at the midpoint voltage level of the sweep (center of the trace) which is determined by the bias provided by the setting of the potentiometer 206. The other diode section 214 of the double diode 213 begins to conduct after the diode section 216 stops conducting. The latter diode section conducts during the second half of the trace. The signal voltage developed across potentiometer 234 as a result of conduction through the diode section 214 is attenuated by the potentiometer 234 to match the first half of the sweep voltage signal generated as a result of conduction in the diode section 216 and is then applied directly to the grid 264 of the cathode follower 256. The output voltage of the cathode follower 256 is applied to the screen grid of the second beam power amplifier 338. Therefore, when the sweep voltage applied to the double diode 213 is a positive voltage and becoming more negative, the voltage applied to the screen grid of the output tube 336 will be of a lower voltage at the start of a trace and will increase as the trace approaches the center of the tube. This will cause less voltage current to flow when the sweep is at one end of a trace than at the center of a trace. The amount of compensation provided is determined by the values of the resistances in the potentiometers 234 and 236. When the sweep voltage applied to the double diode 212 equals the reference voltage which is obtained from the tap 212 of the potentiometer 206, the half of the double diode 213 that was conducting ceases conducting and the other half of the double diode begins to conduct. The signal voltage is maximum when the diode section 214 first starts conducting, which is at the center of the trace and the voltage applied to the screen grid of the beam power amplifier 338 becomes progressively less as the sweep approaches the edge of the trace. The signal voltage output of the section 216 of the double diode 213 has to be phase inverted since the direction of the sweep is opposite to that required for compensation whereas the signal voltage corresponding to the other half of the sweep voltage does not require phase inversion but can be utilized directly to control the screen grid potential of beam power amplifier 338. The two beam power amplifiers 336 and 338 comprise a constant current device to insure constant current flowing through the focus coil 352 regardless of any change in the focus coil resistance. The current through the focus coil changes as a result of the action of the focus compensation circuit or as a result of manual adjustment of potentiometer 355. The action of the focus compensation circuit is unaffected by sweep speed so that no matter how fast or what the form of the sweep signal, the focus will be corrected at all times when the spot is on the tube face. The sweep voltage determines the actual focus of the spot on the face of the cathode ray tube. The compensation circuit described will not work at extremely high sweep frequencies due to the fact that the focus coil has a large inductance. However, it has been found it works very well for slower sweep frequencies such as are encountered in a facsimile recording system.

Obviously many modifications and variations of the present invention are possible in the light of the above teachings. It is therefore to be understood that within the scope of the appended claims the invention may be practiced otherwise than as specifically described.

I claim:

1. Focus means adapted for use in combination with a flat face cathode ray tube and a sweep generator for the flat face cathode ray tube, said focus means comprising; a focus coil adapted to be supported on the flat face cathode ray tube; a regulated direct current power supply having a high potential terminal and a common return; a pair of identical constant-current power tubes, each of which includes a control grid, a screen grid, a plate, and a cathode, the plates of said constant-current tubes being connected in common, the cathodes of said constant-current tubes being connected in common; conductor means connecting said focus coil in series between the high potential terminal of said power supply and the plates of said constant-current tubes; a cathode bias resistor connected between the cathodes of said constant-current tubes and the common return of said power supply; low-wattage resistance means connected across said cathode resistor; a variable tap for said low-wattage resistance means; identical current limiting resistors connected between said variable tap and the control grids of respective ones of said constant-current tubes whereby the current level through said focus coil may be manually adjusted; voltage divider means including a potentiometer connected across said power supply; a pair of diodes, the anode of one of said diodes and the cathode of the other of said diodes being connected in common and adapted for connection to the sweep generator means for the flat face cathode ray tube; a first high resistance means connected to the cathode of the one of said diodes; a second high resistance means connected to the anode of the other of said diode, the other ends of both said high resistance means connected to the tap of said potentiometer whereby the tap of said potentiometer is adapted to be manually adjusted to adjust the reference voltage for said diodes to the mean voltage output level of the sweep generator means to which they are adapted to be connected; separate adjustable taps on said separate high resistance means, respectively; a first cathode follower connected at its input end to the tap of said second high resistance means and at its output end to the screen grid of one of the said constant current tubes; and circuit means including phase inverting and second cathode follower means connected in cascade, said circuit means connected at its input end to the tap of said first high resistance means and at its output end to the screen grid of the other of said constant current tubes; whereby current through said focus coil is automatically adjusted to reduce deflection defocussing.

2. In combination, a flat face cathode ray tube including deflection means; sweep generator means connected to the deflection means of said flat face cathode ray tube; focus means for said flat face cathode ray tube, said focus means including a focus coil supported on the flat face cathode ray tube, a regulated direct current power supply having a high potential terminal and a common return, a pair of identical constant-current power tubes, each of which includes a control grid, a screen grid, a plate, and a cathode, the plates of said constant-current tubes being connected in common, the cathodes of said constant-current tubes being connected in common; conductor means connecting said focus coil in series between the high potential terminal of said power supply and the plates of said constant-current tubes, a cathode bias resistor connected between the cathodes of said constant-current tubes and the common return of said power supply, low-wattage resistance means connected across said cathode resistor, a variable tap for said low wattage resistance means, identical current limiting resistors connected between said variable tap and the control grids of respective ones of said constant-current tubes whereby the current level through said focus coil may be manually adjusted, voltage divider means including a potentiometer connected across the output of said power supply; a pair of diodes, the anode of one of said diodes and the cathode of the other of said diodes being connected in common and connected to said sweep generator means, a first high resistance means connected to the cathode of the one of said diodes, a second high resistance means connected to the anode of the other of said diodes, the other ends of both said high resistance means connected to the tap of said potentiometer, the tap of said potentiometer is adapted to be manually adjusted to adjust the reference voltage for said diodes to the mean voltage output level of the sweep generator means, separate adjustable taps on said separate high resistance means, respectively, a first cathode follower connected at its input end to the tap of said second high resistance means and at its output end to the screen grid of one of said constant-current tubes, and circuit means including phase inverting and second cathode follower means in cascade, said circuit means connected at its input end to the tap of said first high resistance means and at its output end to the screen grid of the other of said constant current tubes, whereby current through said focus coil is automatically adjusted to reduce deflection defocussing.

3. Focus means adapted for use with a flat face cathode ray tube, a sweep generator, and a regulated direct current power supply, said focus means comprising; a focus coil adapted to be mounted on the cathode ray tube; identical first and second electron discharge devices, each of which include a plate, a grid, and a cathode; one end of said focus coil being connected directly to the plates of both said electron discharge devices; a cathode bias resistor connected at one of its ends to the cathodes of both said electron discharge devices; the series-connected focus coil, electron discharge devices, and cathode bias resistor being adapted to be connected across the power supply whereby the current through said focus coil is equal to the sum of the currents through both said electron discharge devices; identical third and fourth electron discharge devices each of which include a plate, a grid, and a cathode; identical cathode resistors connected to said third and fourth electron discharge devices, respectively; said third electron discharge device and its cathode resistor and said fourth electron discharge device and its cathode resistor adapted to be connected across said power supply; a conductor connecting the cathode of said third electron discharge device to the grid of said first electron discharge device; a conductor connecting the cathode of said fourth electron discharge device to the grid of said second electron discharge device; a first diode; a second diode; the cathode of said first diode and the plate of second diode being directly connected and adapted for connection to the sweep generator; a first voltage divider connected in series with the anode of said first diode and having an adjustable tap; a second voltage divider connected in series with the cathode of said second diode and having an adjustable tap; the other ends of both said voltage dividers adapted for connection in circuit with the power supply in order to be raised to a positive reference potential equal to the mean of the sweep potential of the sweep generator; a conductor connecting the tap of one of said voltage dividers to the grids of one of said third and fourth electron discharge devices; and phase inverting means for connecting the tap of the other of said voltage dividers to the grid of the other of said third and fourth electron discharge devices.

4. Focus means adapted for use with a flat face cathode ray tube, a sweep generator, and a regulated direct current power supply, said focus means comprising; a focus coil adapted to be mounted on the cathode ray tube; a pair of electron discharge devices, each of which include a plate, a grid, and a cathode; one end of said focus coil being connected directly to the plates of both said electron discharge devices; the other end of said focus coil adapted to be connected to the positive terminal of the power supply, the cathodes of both said electron discharge devices being directly connected and adapted to be connected in circuit with the return side of the power supply; a first diode; a second diode; the anode of said first diode and the cathode of said second diode being directly connected and adapted for connection to the sweep generator; a first voltage divider having an adjustable output tap; a second voltage divider having an adjustable output tap; one end of each of said voltage dividers being connected in common with the cathode of said first diode and the anode of said second diode, respectively; the other ends of both said voltage dividers being connected directly to one another and being adapted to be connected in circuit with the power supply for clamping to a reference direct current potential that is the mean voltage output of the sweep generator; first bias control means connected in circuit between the tap of said first voltage divider and the grid of one of said electron discharge devices; second bias control means connected in circuit between the tap of said second voltage divider and the grid of the other of said electron discharge devices, said bias control means being active to normally retain the grids of the respective electron discharge devices at a fixed potential; one of said bias control means being adapted to drive the grid of one of said electron discharge devices in a negative direction only when the sweep voltage is between the mean sweep voltage and the minimum sweep voltage; the other one of said bias control means being adapted to drive the grid of the other of said electron discharge devices in a negative direction only when the sweep voltage is between the mean sweep voltage and the maximum sweep voltage.

5. Focus means adapted for use with a flat face cathode ray tube, a sweep generator, and a regulated direct current power supply, said focus means comprising; a focus coil adapted to be mounted on the cathode ray tube; identical first and second conductive means connected in parallel with each other and connected in series with said focus coil; each of said conductive means including means for controlling the conductivity thereof; said series-connected focus coil and conductive means adapted to be connected across said power supply whereby the current through said focus coil is equal to the sum of the currents through said first and second conductive means; identical third and fourth conductive means each in series with respective identical resistors, each of the said third and fourth conductive means and their respective resistors adapted to be connected across the power supply; each of said third and fourth conductive means including means for controlling the conductivity thereof; a conductor connected between the conductivity control means of said first conductive means and the junction between the third conductive means and its resistor; a conductor connected between the conductivity control means of said second conductive means and the junction between the fourth conductive means and its resistor; a first diode; a second diode; the cathode of said first diode and the anode of said second diode being connected directly together and adapted to be connected to the sweep generator; a first voltage divider having an adjustable tap and connected at one end thereof to the anode of said first diode; a second voltage divider having an adjustable tap and connected at one end thereof to the cathode of said second diode; the other ends of both said voltage dividers being connected in common and adapted to be connected to the power supply so as to be clamped at a reference positive direct current potential that is equal to the mean sweep voltage applied to the diodes whereby one of said diodes conducts when the sweep voltage is higher than the reference potential and the other diode conducts when the sweep voltage is lower than the reference potential; a conductor connecting one of the adjustable taps to the conductivity control means of one of said third and fourth conductive means; and a phase inverter connected between the other of the taps and the other one of said third and fourth conductive means.

References Cited in the file of this patent

UNITED STATES PATENTS

| | | |
|---|---|---|
| 2,178,093 | Zworykin et al. | Oct. 31, 1939 |
| 2,196,838 | Rogowski et al. | Apr. 9, 1940 |
| 2,220,303 | Tingley | Nov. 5, 1940 |
| 2,227,036 | Schlesinger | Dec. 31, 1940 |
| 2,430,331 | Galella et al. | Nov. 4, 1947 |
| 2,472,165 | Mankin | June 7, 1949 |
| 2,623,195 | Best | Dec. 23, 1952 |
| 2,664,521 | Schlesinger | Dec. 29, 1953 |